US012769286B2

(12) United States Patent
Shao et al.

(10) Patent No.: US 12,769,286 B2
(45) Date of Patent: Oct. 20, 2026

(54) SMART GAS EMERGENCY GAS SUPPLY DEVICE AND INTERNET OF THINGS SYSTEM THEREOF

(71) Applicant: CHENGDU QINCHUAN IOT TECHNOLOGY CO., LTD., Chengdu (CN)

(72) Inventors: Zehua Shao, Chengdu (CN); Bin Liu, Chengdu (CN); Yaqiang Quan, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 386 days.

(21) Appl. No.: 18/530,175

(22) Filed: Dec. 5, 2023

(65) Prior Publication Data

US 2024/0111270 A1 Apr. 4, 2024

(30) Foreign Application Priority Data

Oct. 12, 2023 (CN) ........................ 202311321641.2

(51) Int. Cl.
*G05B 19/416* (2006.01)
*G16Y 10/35* (2020.01)
*G16Y 40/35* (2020.01)

(52) U.S. Cl.
CPC .. *G05B 19/416* (2013.01); *G05B 2219/41108* (2013.01); *G16Y 10/35* (2020.01); *G16Y 40/35* (2020.01)

(58) Field of Classification Search
CPC ........ G05B 19/416; G05B 2219/41108; G16Y 10/35; G16Y 40/35; G06Q 50/06
See application file for complete search history.

(56) References Cited

U.S. PATENT DOCUMENTS

2015/0149097 A1* 5/2015 Wada .................... G01F 15/063 702/45
2020/0293997 A1* 9/2020 Shao ...................... G08B 21/18
(Continued)

FOREIGN PATENT DOCUMENTS

CN 102606875 A 7/2012
CN 102606880 A 7/2012
(Continued)

OTHER PUBLICATIONS

Yang Guoying, Ren Yongping, Chen Shuping and Feng Chenran, "Structural design of skid-mounted fueling station for LNG vehicles," 2011 International Conference on Materials for Renewable Energy & Environment, Shanghai, China, 2011, pp. 1971-1975 (Year: 2011).*

*Primary Examiner* — Christopher E. Everett
(74) *Attorney, Agent, or Firm* — METIS IP LLC

(57) ABSTRACT

A smart gas emergency gas supply equipment is provided. The smart gas emergency gas supply equipment may be an emergency vehicle including a skid-mounted vehicle, a gas storage tank, an extensible pipeline group, a pressure regulating device, a gasification device, and a control module. The control module may be configured to determine, based on an emergency gas supply plan of the smart gas emergency gas supply device, operating parameters of the pressure regulating device and the gasification device. The emergency gas supply plan at least includes a gas source selection plan and a gas demand, the gas source selection plan may at least include a gas pipeline network crossover and a gas tank direct supply.

15 Claims, 5 Drawing Sheets

100

(56) References Cited

U.S. PATENT DOCUMENTS

| | | | | |
|---|---|---|---|---|
| 2022/0146048 | A1* | 5/2022 | Ewan | F17C 11/005 |
| 2022/0180453 | A1* | 6/2022 | Wada | G06Q 50/06 |

FOREIGN PATENT DOCUMENTS

| | | | |
|---|---|---|---|
| CN | 103234116 | B | 10/2015 |
| CN | 107508326 | A | 12/2017 |
| CN | 112145965 | A | 12/2020 |
| CN | 113626435 | A | 11/2021 |
| CN | 114580691 | A | 6/2022 |
| CN | 115640914 | A | 1/2023 |
| CN | 115936449 | A | 4/2023 |
| CN | 116862710 | A | 10/2023 |

* cited by examiner

100

SMART GAS EMERGENCY GAS SUPPLY DEVICE AND INTERNET OF THINGS SYSTEM THEREOF

CROSS-REFERENCE TO RELATED APPLICATION

This application claims priority of Chinese Patent Application No. 202311321641.2, filed on Oct. 12, 2023, the content of which is entirely incorporated herein by reference.

TECHNICAL FIELD

The present disclosure is related to a field of gas emergency supply, and in particular, to a smart gas emergency gas supply equipment and an Internet of Things system.

BACKGROUND

At present, a city life may not be separated from a gas, when transmission pipeline accidents and other emergency situations happen, a daily life of users may be greatly affected, and a gas emergency supply may generally be carried out.

CN112145965A provides a vehicle-mounted gas emergency equipment and a gas emergency vehicle, and the gas emergency equipment is a gas emergency device of the gas being mounted in advance in a gas storage device, and the gas is delivered to the user after gasification and pressure regulation through a gasification device and a pressure regulator. However, when a gas storage is insufficient, the emergency gas supply may not be ensured.

Therefore, a smart gas emergency gas supply equipment and Internet of Things (IoT) system are provided so as to improve a reliability of the gas emergency supply and an emergency rescue level, and to avoid impacts caused by a gas outage accident.

SUMMARY

One or more embodiments of the present disclosure provide a smart gas emergency gas supply device. The smart gas emergency gas supply device may be an emergency vehicle including a skid-mounted vehicle, a gas storage tank, an extensible pipeline group, a pressure regulating device, a gasification device, and a control module. The skid-mounted vehicle may be configured to install the gas storage tank, the extensible pipeline group, the extensible pipeline group, the pressure regulating device, the gasification device, and the control module by skid-mounting. The extensible pipeline group may at least include a gas inlet pipeline group and a gas outlet pipeline group. The gas inlet pipeline group may be configured to connect to a pipeline in a gas pipeline network or an emergency vehicle to be dispatched within a preset range, and the gas outlet pipeline group may be configured to connect to the pipeline in the gas pipeline network or the pressure regulating device. The pressure regulating device may be configured to regulate a gas pressure. The gasification device may be configured to gasify a gas in the gas storage tank. The control module may be configured to determine, based on an emergency gas supply plan of the smart gas emergency gas supply device, operating parameters of the pressure regulating device and the gasification device. The emergency gas supply plan may at least include a gas source selection plan and a gas demand. The gas source selection plan may at least include a gas pipeline network crossover and a gas tank direct supply.

One or more embodiments of the present disclosure provide a smart gas emergency gas supply Internet of Things (IoT) system, the system may include a smart gas device object platform and a smart gas safety management platform. The smart gas device object platform may be configured to manage a smart gas emergency gas supply device. The smart gas emergency gas supply equipment may be an emergency vehicle including a skid-mounted vehicle, a gas storage tank, an extendable pipeline group, a pressure regulating device, a gasification device, and a control module. The skid-mounted vehicle may be configured to install the gas storage tank, the extensible pipeline group, the pressure regulating device, the gasification device, and the control module by skid-mounting. The extensible pipeline group may at least include a gas inlet pipeline group and a gas outlet pipeline group. The gas inlet pipeline group may be configured to connect to a pipeline in a gas pipeline network or an emergency vehicle to be dispatched within a preset range, and the gas outlet pipeline group may be configured to connect to the pipeline in the gas pipeline network or the pressure regulating device. The pressure regulating device may be configured to regulate a gas pressure. The gasification device may be configured to gasify a gas in the storage tank. The control module may be configured to determine, based on an emergency gas supply plan of the smart gas emergency gas supply device, operating parameters of the pressure regulating device and the gasification device. The emergency gas supply plan may at least include a gas source selection plan and a gas demand. The gas source selection plan may at least include a gas pipeline network crossover and a gas tank direct supply.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
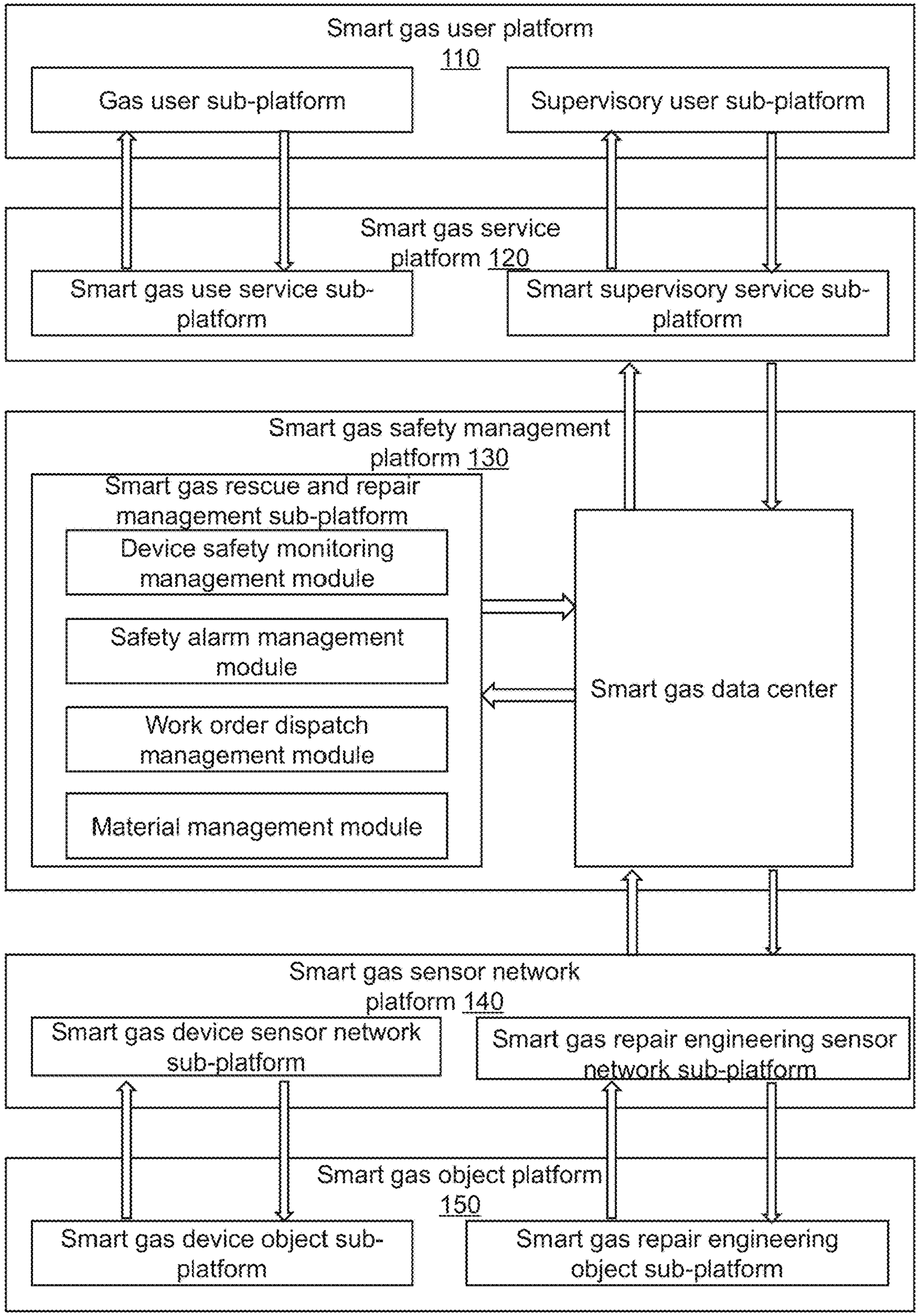
FIG. 1 is a schematic diagram illustrating an exemplary smart gas Internet of Things (IoT) system according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following descriptions are only some examples or embodiments of the present disclosure, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms “system”, “device”, “unit,” and/or “module” as used herein is a way to distinguish between different components, elements, parts, sections, or assemblies at different levels. However, the words may be replaced by other expressions if other words accomplish the same purpose.

Flowcharts are used in the present disclosure to illustrate operations performed by a system according to embodiments of this disclosure. It should be appreciated that the preceding or following operations are not necessarily performed in an exact sequence. Instead, the operations be processed in reverse order or simultaneously. Also, it is possible to add other operations to these processes, or to remove an operation or operations from these processes.

Performing an emergency gas supply through a gas storage equipment and gas in a gas transportation vehicle may have a problem of limited supply capacity, and at the same time, circulating the gas supply through a plurality of gas transportation vehicles may have problems of high cost and troublesome operation. Therefore, it is necessary to provide a smart gas emergency supply equipment and Internet of Things (IoT) system to improve a reliability of gas emergency supply and reduce a cost of emergency repair. The prior art provides a gas emergency equipment and a gas emergency vehicle, but it does not address how to adjust a mode for emergency gas supply and how to predict a gas demand. Therefore, in some embodiments of the present disclosure, by providing a smart gas emergency gas supply equipment, the emergency gas supply at a local gas supply point in a gas pipeline network may be realized, and the emergency gas supply plan may be flexibly deployed.

FIG. 1 is a schematic diagram illustrating an exemplary smart gas IoT system 100 according to some embodiments of the present disclosure.

As shown in FIG. 1, the smart gas IoT system 100 may include a smart gas user platform 110, a smart gas service platform 120, a smart gas safety management platform 130, a smart gas sensor network platform 140, and a smart gas object platform 150.

The smart gas user platform 110 may be a platform for interacting with a user. In some embodiments, the smart gas user platform 110 may be configured as a terminal device. In some embodiments, the smart gas user platform 110 may include a gas user sub-platform and a supervisory user sub-platform.

The smart gas service platform 120 may be a platform for conveying demand and control information of the user. For example, the smart gas service platform 120 may obtain gas information from the smart gas safety management platform 130 and send the gas information to the smart gas user platform 110. In some embodiments, the smart gas service platform 120 may include a smart gas use service sub-platform and a smart supervisory service sub-platform.

The smart gas safety management platform 130 may be a platform for overall planning and coordinating connections and cooperation among various functional platforms, aggregating all information of the IoT, and providing functions of perceptual management and control management for the IoT operation system. In some embodiments, the smart gas management platform 130 may include a smart gas rescue and repair management sub-platform and a smart gas data center.

The smart gas rescue and repair management sub-platform may be a platform for managing gas rescue and repair. In some embodiments, the smart gas rescue and repair management sub-platform may include a device safety monitoring management module, a safety alarm management module, a work order dispatch management module, and a material management module. The device safety monitoring management module may be configured to query historical safety operation data and current safety operation data of the smart gas object platform 150. The safety alarm management module may be configured to query or remotely process safety alarm information uploaded by the smart gas object platform 150. If staff is required to carry out an on-site emergency repair (e.g., an emergency gas supply), the smart gas emergency repair management sub-platform may directly switch to the work order dispatch management module through the safety alarm management module. The work order dispatch management module may be configured to dispatch engineering and repair personnel according to a task requirement and to confirm and query a progress of a work order execution progress. The material management module may be configured to query a material collector, a category, and a quantity of the corresponding work order.

The smart gas data center may be configured to store and manage all operational information of the smart gas IoT system 100. In some embodiments, the smart gas data center may be configured as a storage device for storing data related to gas information, etc.

In some embodiments, the smart gas rescue and repair management sub-platform may be configured to transmit user information, gas demand, and other relevant data to the smart gas data center for analysis and processing, so as to determine a gas source selection plan. The smart gas rescue and repair management sub-platform may implement the gas source selection plan. In some embodiments, the smart gas safety management platform 130 may be configured to retrieve relevant data, such as the user information, from the smart gas user platform 110 to determine the gas source selection plan.

In some embodiments, the smart gas safety management platform 130 may be configured to retrieve relevant data, such as the user information, from the smart gas user platform 110, to determine the gas demand. In some embodiments, the smart gas safety management platform 130 may be configured to determine the gas demand based on data output from the safety alarm management module of the smart gas rescue and repair management sub-platform.

In some embodiments, the smart gas safety management platform 130 may be configured to obtain, in real time, monitoring data obtained from the smart gas object platform 150 uploaded by the smart gas sensor network platform 140 (e.g., a current position of the emergency vehicle, an idle-busy state, a gas tank storage capacity, etc.), and regulating an operating parameter of the smart gas object platform 150 based on the monitoring data.

The smart gas sensor network platform 140 may be a functional platform that manages a sensor communication. In some embodiments, the smart gas sensor network platform 140 may include a smart gas device sensor network sub-platform and a smart gas repair engineering sensor network sub-platform.

The smart gas object platform 150 may be a functional platform for sensor information generation and controlling information execution. In some embodiments, the smart gas data center may obtain the monitoring data of a plurality of devices of the smart gas object platform 150, e.g., the parameter of each device, an operating state, etc.

In some embodiments, the smart gas object platform 150 may include a smart gas device object sub-platform and a smart gas repair engineering object sub-platform. In some embodiments, the smart gas device object sub-platform may be configured as a smart gas emergency gas supply device. The smart gas emergency gas supply device may be an emergency vehicle including a skid-mounted vehicle, a gas storage tank, an extensible pipeline group, a pressure regulating device, a gasification device, and a control module.

In some embodiments, the control module and/or the smart gas safety management platform 130 may be configured to determine the operating parameter of the pressure regulating device and the gasification device based on the emergency gas supply plan of the smart gas emergency gas supply equipment. The emergency gas supply plan may at least include a gas source selection plan and a gas demand, and the gas source selection plan may at least include a gas pipeline network crossover and a gas tank direct supply.

In some embodiments of the present disclosure, based on the smart gas IoT system 100, a closed loop of information operation may be formed between the smart gas object platform 150 and the smart gas user platform 110, and the closed loop may be coordinated and regularly operated under a unified management of the smart gas safety management platform 130, realizing visualization and intelligence of gas data and a gas task.

Figure 2:
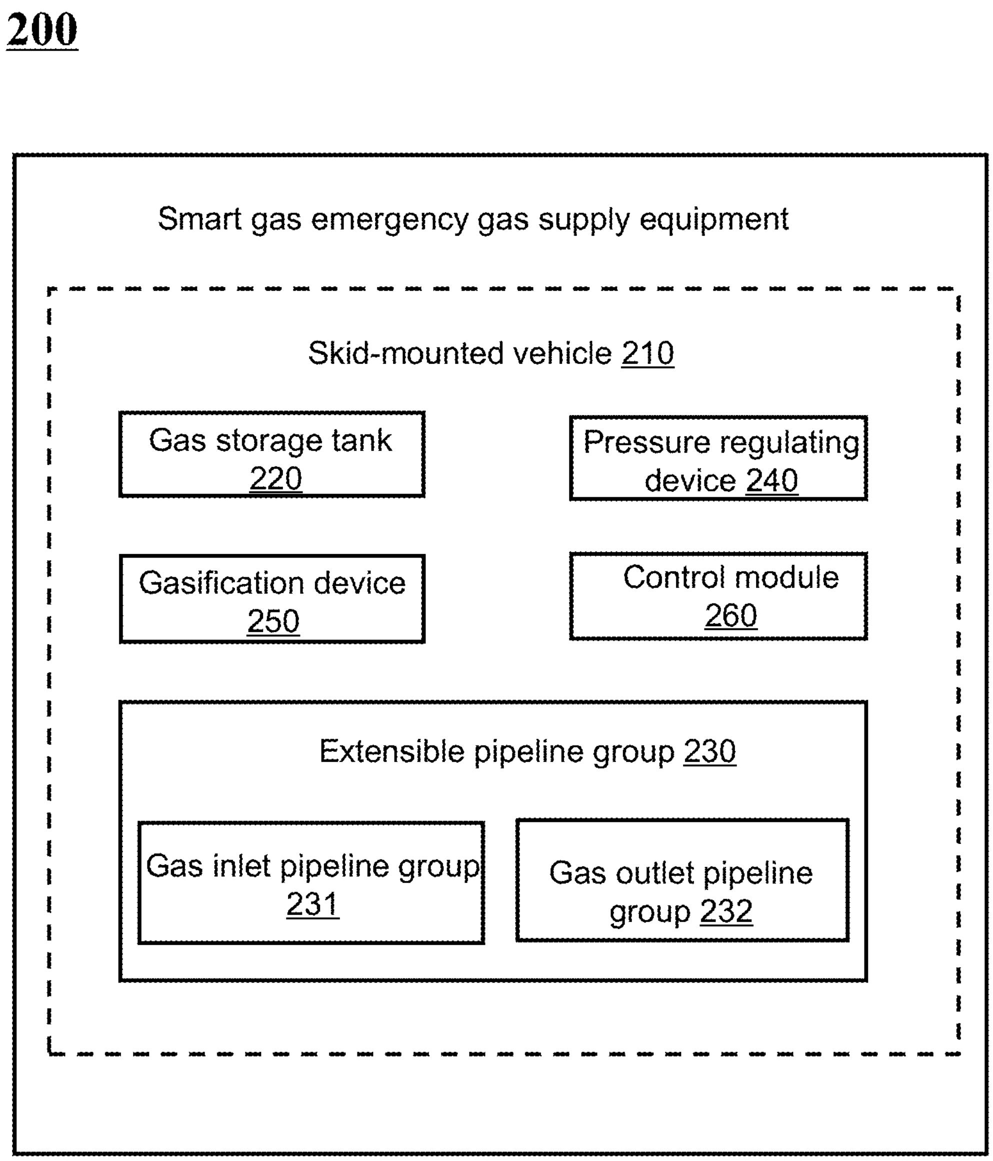
FIG. 2 is a schematic diagram illustrating an exemplary smart gas emergency gas supply equipment according to some embodiments of the present disclosure.

FIG. 2 is a schematic diagram illustrating an exemplary smart gas emergency gas supply equipment 200 according to some embodiments of the present disclosure.

As shown in FIG. 2, the smart gas emergency gas supply equipment 200 may include a skid-mounted vehicle 210, a gas storage tank 220, an extensible pipeline group 230, a pressure regulating device 240, a gasification device 250, and a control module 260. In some embodiments, the smart gas emergency gas supply equipment 200 may include an emergency vehicle.

The skid-mounted vehicle 210 refers to a frame structure for a device integration. Multiple pieces of devices may be mounted on the skid-mounted vehicle 210 at the same time, allowing for an overall relocation of the devices. In some embodiments, the skid-mounted vehicle 210 may be configured to install the gas storage tank 220, the extensible pipeline group 230, the pressure regulating device 240, the gasification device 250, and the control module 260 by way of skidding.

The extensible pipeline group 230 refers to one or more pipelines for inter-pipeline connections. The extensible pipeline group 230 may enable extension of pipelines to be connected. In some embodiments, the extensible pipeline group 230 may at least include a gas inlet pipeline group 231 and a gas outlet pipeline group 232.

The gas inlet pipeline group 231 refers to one or more pipelines for connecting to a gas source end. In some embodiments, the gas source end may include the pipelines in a gas pipeline network and a gas storage tank. In some embodiments, the gas storage tank may include the gas storage tank 220 of the smart gas emergency gas supply equipment 200 and the gas storage tank of emergency vehicles to be dispatched within a preset range.

The preset range may be a preset region with a certain size. For example, the preset range may be a region centered on location information (e.g., a current location of the emergency vehicle, a gas supply point, etc.) and with a preset distance as a radius. In some embodiments, the preset distance may be a system default or may be adjusted according to an actual situation. For example, the preset distance may be relatively small when the gas supply point is close to a gas storage station, and the preset distance may be relatively great when the gas supply point is far away from the gas storage station.

The emergency vehicle to be dispatched is one or more emergency vehicles whose current location is within the preset range. For example, the emergency vehicle to be dispatched may be an idle emergency vehicle located within the preset range. For another example, the emergency vehicle to be dispatched may be one or more emergency vehicles that have a distance from the gas supply point that satisfies a first distance threshold. The first distance threshold may be set based on experience.

The gas outlet pipeline group 232 refers to one or more pipelines for connecting the gas supply point and/or a gas supply device. In some embodiments, the gas supply point may include a pipeline in a gas pipeline network, and the gas supply device may include the pressure regulating device 240.

The pressure regulating device 240 refers to a device for regulating a gas pressure. In some embodiments, the pressure regulating device 240 may be configured to regulate the gas pressure of the gas before the gas is output, and to deliver the regulated gas to the gas supply point for use by a user through the gas outlet pipeline group 232.

In some embodiments, the operating parameter of the pressure regulating device 240 may include an inlet pressure, an outlet pressure, a regulating range, etc. For example, the inlet pressure may be 0.5 to 6.4 Mpa, the outlet pressure may be 1.6 to 2.5 Mpa, and the regulating range may be 0.2 to 2 Mpa.

The gasification device 250 refers to a device for gasifying the gas in the gas storage tank. In some embodiments, when the gas supply end is the gas storage tank, the gas storage tank may be connected to the gasification device 250 through a gas transmission pipeline for transmitting the gas stored in the gas storage tank to the gasification device 250 through the gas transmission pipeline. The gasification device 250 may be connected to the pressure regulating device 240 through the gas transmission pipeline for transmitting the gas after gasification and warming to the pressure regulating device 240.

In some embodiments, the operating parameter of the gasification device 250 may include a gasification pressure, an operating temperature, etc. For example, the gasification pressure may be from 0.8 to 40 Mpa, and the operating temperature may be from −40 to +50° C.

The control module 260 refers to a module for receiving a control command and executing the control command. In some embodiments, the control module 260 may determine, based on the emergency gas supply plan of the smart gas emergency gas supply equipment 200, the operating parameters of the pressure regulating device 240 and gasification device 250 by receiving the control command issued by the smart gas safety management platform 130.

The emergency gas supply plan refers to a means of supplying gas to the user through the gas supply point. In some embodiments, the emergency gas supply plan may at least include the gas source selection plan and the gas demand.

In some embodiments, the control module 260 may generate an emergency gas supply plan by obtaining data from a smart gas data center. In some embodiments, the smart gas safety management platform 130 may directly generate the emergency gas supply plan and send the emergency gas supply plan down to the control module 260.

The gas demand refers to information related to the gas supply. In some embodiments, the gas demand may include a gas usage volume demand, a gas flow demand, a gas pressure demand, etc. For example, the gas usage volume demand may be a total gas demand at a user end, and the gas flow demand may be positively correlated to a user count.

The gas source selection plan refers to a selection of a gas source end. In some embodiments, the gas source selection plan may at least include a gas pipeline network crossover and a gas tank direct supply.

In some embodiments, when the gas source end is the pipeline in the gas pipeline network, the gas source selection plan may be the gas pipeline network crossover. The gas network crossover refers to supplying gas to the user by straddling ends of a faulty pipeline and using the gas from the gas pipeline network as an emergency gas supply gas source. For example, by disconnecting between a faulty pipeline B and normal pipelines A and C, the ends of the gas inlet pipeline group 231 may be connected to the normal pipelines A and C, respectively, in order to realize the gas pipeline network crossover.

In some embodiments, when the gas source end is a gas storage tank, the gas source selection plan may be the gas tank direct supply. The gas tank direct supply refers to supplying gas to the user by using the gas in the gas storage tank as an emergency gas supply gas source.

In some embodiments, the smart gas safety management platform 130 may directly use the gas storage tank 220 of the smart gas emergency gas supply equipment 200 as an emergency gas supply gas source to supply gas to the user. In some embodiments, the smart gas safety management platform 130 may supply gas to the user by dispatching the emergency vehicle to be dispatched within a preset range to the gas supply point, and connecting the gas storage tank of the emergency vehicle through the gas inlet pipeline group 231.

In some embodiments, the gas pipeline network crossover and the gas tank direct supply may also be used simultaneously. For example, when the gas pipeline network crossover has not yet been completed, the gas tank direct supply may be used first to supply gas to the user to achieve a smooth gas supply.

In some embodiments, the control module 260 may determine the operating parameters of the pressure regulating device 240 and the gasification device 250 based on the gas demand. For example, the control module 260 may determine the operating parameters of the pressure regulating device 240 and the gasification device 250 based on the gas usage volume demand, the gas flow demand, the gas pressure demand, etc. of the pipeline where the gas supply point is located. For example, when the gas usage volume demand and/or the gas flow demand are greater and the gas pressure in the pipeline fluctuates greatly, the operating parameters of the pressure regulating device 240 and the gasification device 250 may be appropriately increased to achieve a balance of the gas pressure in the pipeline.

In some embodiments, the control module 260 may determine the operating parameter of the gasification device 250 based on the gas source selection plan. For example, when the gas source end is the gas storage tank, the operating parameter of the gasification device 250 may be set based on a using specification of a manufacturer. For another example, when the gas source end is the pipeline in the gas pipeline network, the operating parameter of the gasification device 250 may be set to 0, i.e., to shut down the gasification device 250.

In some embodiments of the present disclosure, by providing the smart gas emergency gas supply equipment including the skid-mounted vehicle, the gas storage tank, the extensible pipeline group, the pressure regulating device, the gasification device, and the control module, it may be possible to realize the emergency gas supply for a localized gas supply point in the gas pipeline network. In this way, the emergency gas supply plan may be flexibly adjusted based on actual demands of the gas supply point, thus greatly avoiding an impact of a gas outages, and buying time for the emergency repair.

Figure 3:
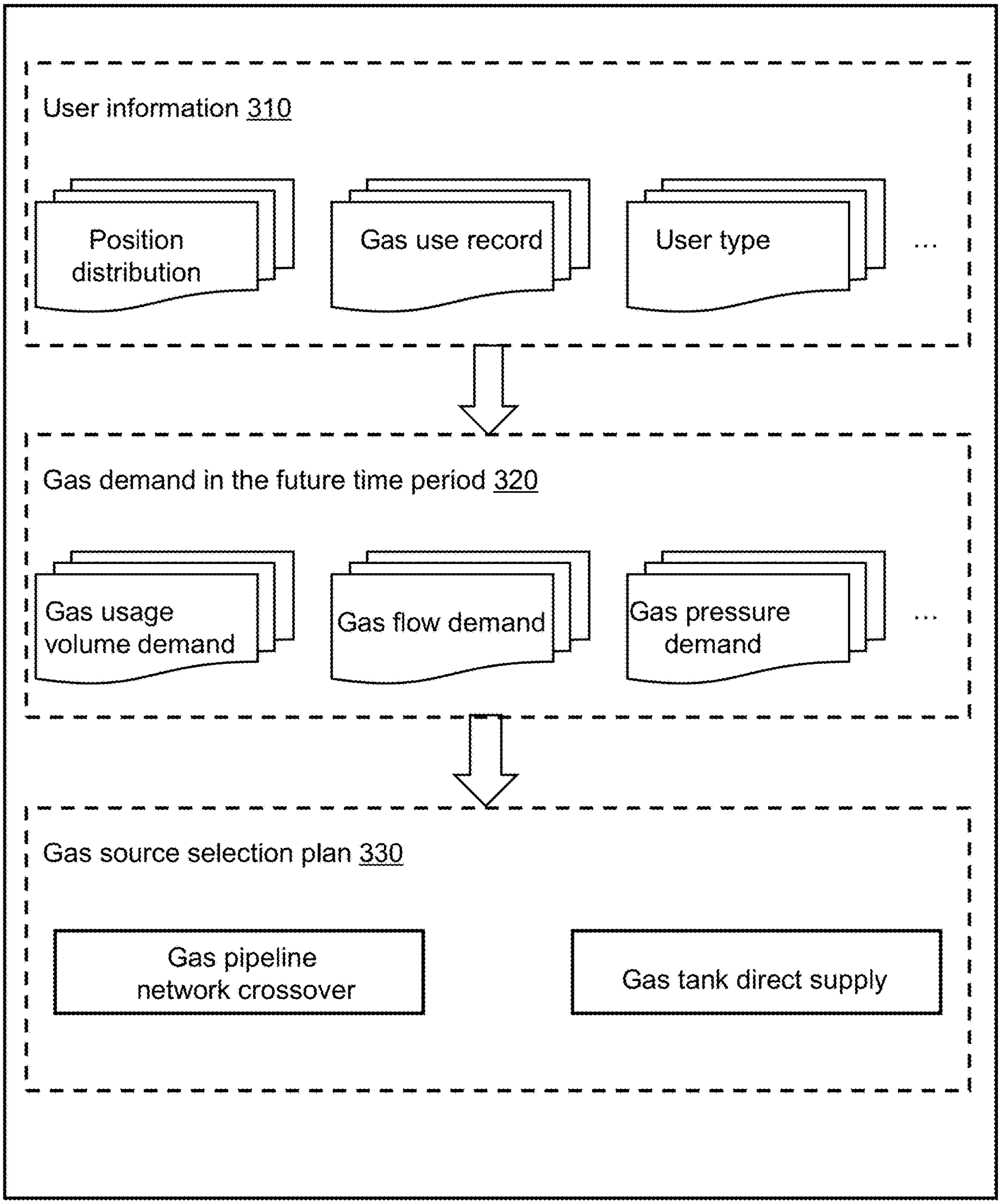
FIG. 3 is a schematic diagram illustrating an exemplary process for determining a gas source selection plan according to some embodiments of the present disclosure.

FIG. 3 is a schematic diagram illustrating an exemplary process for determining a gas source selection plan according to some embodiments of the present disclosure. In some embodiments, a gas source selection plan 330 may be determined based on user information 310 of a user to be supplied with gas. In some embodiments, the determination of the gas source selection plan 330 may be performed based on the smart gas safety management platform 130 and/or the control module 260.

As shown in FIG. 3, based on the user information 310, the gas demand 320 in a future time period may be predicted.

The user information 310 refers to information related to the user to be supplied with gas. For example, the user information 310 may include a user position distribution, a gas use record, a user type, etc. The user type may include a commercial user, a residential user, etc. For more contents on the gas use record, please refer to FIG. 4 and the related descriptions.

In some embodiments, the smart gas safety management platform 130 may obtain the user information 310 in various ways. For example, the smart gas safety management platform 130 may obtain the user information through a user input, a storage device within or outside the system, etc.

For more contents on the gas demand, please refer to FIG. 2 and the associated descriptions.

In some embodiments, the gas demand 320 in the future time period may be predicted in various ways. For example, the gas demand 320 in the future time period may be predicted based on historical gas demand data. Exemplarily, the smart gas safety management platform 130 may obtain the historical gas demand data for a plurality of the same historical time period corresponding to the future time period, statistically average the historical gas demand data (e.g., calculating an average value, a median value, etc.) of the historical gas demand data, and use the statistical average of the historical gas demand data (e.g., a historical average gas usage volume, a historical average gas flow, a historical average gas pressure, etc.) as the gas demand 320 in the future time period.

In some embodiments, the smart gas safety management platform 130 may predict the gas demands 320 in a plurality of future time periods based on the user information 320.

Figure 4:
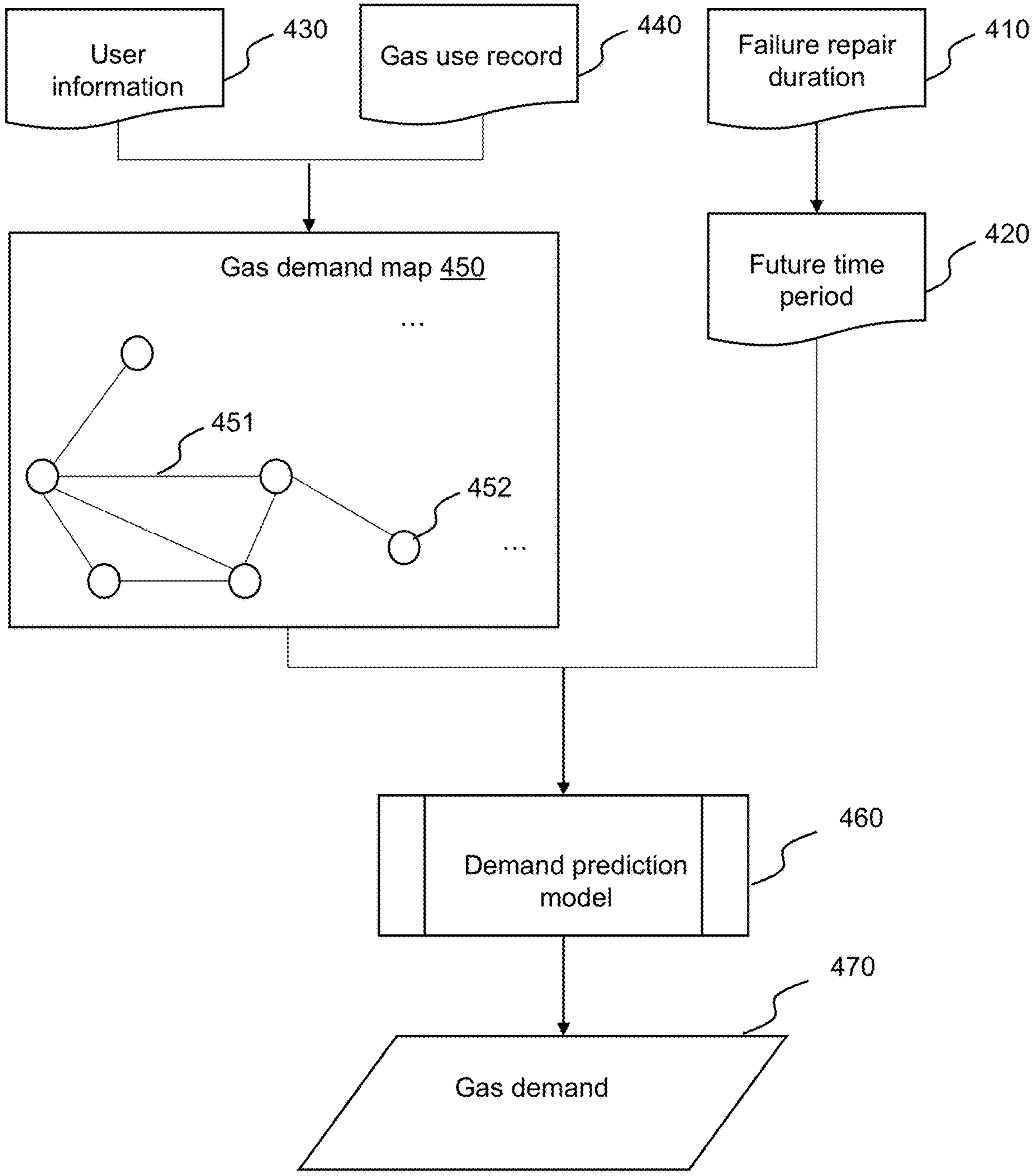
FIG. 4 is a schematic diagram illustrating an exemplary process for predicting a gas demand according to some embodiments of the present disclosure.

In some embodiments, the gas demand may be predicted by a demand prediction model, for more contents, please refer to FIG. 4 and the related descriptions.

As shown in FIG. 3, the gas source selection plan 330 may be determined based on the gas demand 320 in the future time period.

In some embodiments, the gas source selection plan 330 may be determined in various ways. For example, the gas source selection plan 330 may be determined based on the historical gas supply data from the gas supply point.

Exemplarily, the smart gas safety management platform 130 may obtain the historical gas usage at the gas supply point during the same period of time, statistically average the historical gas usages, and take a statistical average of the historical gas usage as an emergency gas supply volume. When the emergency gas supply volume is lower than a preset gas usage threshold, the gas tank direct supply may be used; and when the emergency gas supply volume is higher than or reaches the preset gas usage threshold, the gas pipeline network crossover may be used.

In some embodiments, the smart gas safety management platform 130 may determine a gas pipeline network crossover cost and a gas tank direct supply cost based on the gas demand, and determine the gas source selection plan 330 based on the gas pipeline network crossover cost and the gas tank direct supply cost.

The gas network crossover cost refers to a cost corresponding to completing a gas pipeline network crossover. For example, the gas pipeline network crossover cost may be related to a manpower requirement, a deployment duration, a crossover length, etc. corresponding to the gas pipeline network crossover. The crossover length refers to a pipeline length of a faulty pipeline or a service pipe.

In some embodiments, the manpower requirement and the deployment duration may be determined based on a historical inspection and/or repair data corresponding to the crossover length. In some embodiments, the manpower requirement and the deployment duration may also be set by the system. In some embodiments, the gas network crossover cost may be positively correlated to the manpower requirement, the deployment duration, the crossover length, etc.

The gas tank direct supply cost refers to the cost corresponding to completing the gas tank supply. For example, the gas tank direct supply cost may be related to an emergency vehicle trip and a transportation distance corresponding to the gas tank direct supply. In some embodiments, the gas tank direct supply cost may be positively correlated to the emergency vehicle trip, the transportation distance, etc.

In some embodiments, the gas tank direct supply cost may also be correlated to a demand degree of the emergency vehicle to be dispatched within a preset range. For example, the gas tank direct supply cost may be positively correlated to the demand degree of the emergency vehicle to be dispatched.

The demand degree refers to a parameter used to assess a degree of demand for the emergency vehicle. In some embodiments, the demand degree may be expressed in words, numbers, percentages, etc.

In some embodiments, the demand degree for the emergency vehicle to be dispatched may be determined based on emergency vehicle information. The emergency vehicle information may include a request volume, a current position, an idle-busy state, a gas tank storage capacity, etc. For more contents about the emergency vehicle information, please refer to FIG. 5 and the related descriptions.

In some embodiments, the demand degreed for the emergency vehicle to be dispatched may be determined based on the request volume and a number of the emergency vehicle to be dispatched (e.g., idle emergency vehicles, etc.). The request volume refers to a number of times the emergency vehicles to be dispatched have been requested to perform emergency rescue tasks. For example, the demand degree for the emergency vehicles to be dispatched may be a ratio of the request volume to the number of emergency vehicles to be dispatched. When the ratio is less than or equal to 1, the emergency vehicles to be dispatched may satisfy the request volume, and when the ratio is greater than 1, the emergency vehicles to be dispatched may not satisfy the request volume.

In some embodiments of the present disclosure, by comprehensively considering the demand degree of the emergency vehicle, the emergency vehicle capable of timely responding to the emergency gas supply task of the gas supply point may be prioritized for dispatching the emergency vehicle, so as to greatly improve a possibility of continuous gas supply, and to ensure the gas supply of the gas supply point.

In some embodiments, the gas network pipeline crossover cost may be determined based on a first balance value. The first balance value may at least include a manpower balance value, a duration balance value, and a length balance value. In some embodiments, the first balance value may be set based on experience. For example, the smart gas safety management platform 130 may determine the first balance value based on a manpower demand, a deployment duration, and a crossover length corresponding to an ideal cost (e.g., a cost that is within an emergency response budget) when V cubic meters of gas is supplied.

In some embodiments, the gas network pipeline crossover cost may be determined based on a ratio of the manpower demand, the deployment duration, and the crossover length corresponding to the gas demand to the corresponding first balance value. For example, the smart gas safety management platform 130 may determine a first ratio of the manpower requirement to the manpower balance value, a second ratio of the deployment duration to the duration balance value, and a third ratio of the crossover length to the length balance value, respectively. A statistical value (a mean, a weighted average, etc.) of the first ratio, the second ratio, and the third ratio, may be determined as the gas pipeline network crossover cost.

In some embodiments, the gas tank direct supply cost may be determined based on a second balance value. The second balance value may at least include a trip balance value and a distance balance value. In some embodiments, the second balance value may be set based on experience. The determination of the second balance value may be similar to the determination of the first balance value. The determination of the gas tank direct supply cost is similar to the determination of the gas pipeline network crossover cost.

In some embodiments, the gas pipeline network crossover cost and the gas tank direct supply cost may also be determined by a machine learning model, such as, for example, a neural network model, etc.

In some embodiments, the smart gas safety management platform 130 may determine the gas source selection plan by comparing the gas pipeline network crossover cost and the gas tank direct supply cost. For example, when the gas pipeline network crossover cost is higher than the gas tank direct supply cost, a gas source end of the gas source selection plan may be a gas storage tank.

In some embodiments, the smart gas safety management platform 130 may determine a gas source selection plan based on the actual situation by adjusting the gas pipeline network crossover cost and the gas tank direct supply cost through an adjustment coefficient. The adjustment coefficient may be greater than or equal to 1. For example, when the demand degree of the emergency vehicle to be dispatched is greater than 1, the adjustment coefficient may be distributed to the gas tank direct supply cost, at this time, the gas source end may be the pipeline in the gas pipeline network.

In some embodiments of the present disclosure, the gas source selection plan may be determined by comprehensively considering the gas pipeline network crossover cost and the gas tank direct supply cost. In this way, the costs of different emergency gas supply may be assessed in a quantitative manner, which allows for a combination of an actual available resource and an actual gas demand.

In some embodiments of the present disclosure, the gas source selection plan may be determined by predicting the gas demand in the future time period. In this way, the emergency gas supply plan, the emergency vehicle dispatchment, the repair personnel, and the repair material, etc. at the gas supply point may be adjusted in advance, thereby greatly avoiding an impact of gas outages, and improving an efficiency of emergency rescue.

FIG. 4 is a schematic diagram illustrating an exemplary process for predicting a gas demand according to some embodiments of the present disclosure.

In some embodiments, the smart gas safety management platform 130 may determine a future time period 420 based on a failure repair duration 410, determine a gas demand map 450 based on user information 430 and a gas usage record 440, and predict a gas demand in the future time period 470 based on the gas demand map 450 through a demand prediction model 460.

In some embodiments, the smart gas safety management platform 130 may determine the failure repair duration 410 based on failure information by corresponding historical repair data. For example, the smart gas safety management platform 130 may determine a statistical value (e.g., a mean value, a median value, etc.) of a historical repair duration based on the historical repair data, and determine the statistical value as the failure repair duration 410.

The failure information may include a failure description, a failure image, a failure point location, etc. fed back by a user. The historical repair data may include the historical repair duration, a historical repair material quantity, etc. The smart gas safety management platform 130 may obtain the failure information and/or the historical repair data through the smart gas object platform 150, the smart gas sensor network platform 140, etc.

In some embodiments, the failure repair duration 410 may also be determined by staff assessment, and the failure repair duration 410 may be uploaded to the smart gas safety management platform 130 through a user terminal.

In some embodiments, the smart gas safety management platform 130 may determine a failure repair termination time point based on a predicted failure repair start time point and the failure repair duration 410. A time period from the failure repair start time point to the failure repair termination time point may be a candidate time period. The smart gas safety management platform 130 may determine, based on the candidate time period, a corresponding historical candidate time period, and determine, based on the corresponding historical candidate time period, historical gas demand data (e.g., a user number, a historical gas usage volume per unit of time, and a historical gas flow, etc.). The smart gas safety management platform 130 may determine a sub-time period within the historical candidate time period whose historical gas demand data reaches or exceeds a preset demand threshold as the future time period 420 within the candidate time period that needs an emergency gas supply.

For example, the smart gas safety management platform 130 may determine a sub-time period of the historical candidate time period corresponding to the candidate time period in which the historical gas usage volume is higher than a usage threshold as a future time period 420 within the candidate time period that needs the emergency gas supply. For another example, the smart gas safety management platform 130 may determine a sub-time period of the historical candidate time period whose historical gas flow is higher than a flow threshold as a future time period 420 within the candidate time period that needs the emergency gas supply.

In some embodiments, the smart gas safety management platform 130 may also directly determine the candidate time period as the future time period 420.

The gas use record 440 refer to an amount of gas used in different sub-time periods within a historical time period (e.g., a week, etc.) of a user to be supplied with gas. For example, the gas use record may be a gas usage Q cubic meters per day, within the past week of the user to be supplied with gas.

The gas demand map 450 may be a map for indicating the gas demand. In some embodiments, the gas demand map 450 may be a data structure including nodes 451 and edges 452 connecting nodes 451, and the nodes 451 and the edges 452 may have features.

The node 452 may include a user node, a gas pipeline branch node, and a gas supply point. The user node may correspond to at least one user to be supplied with gas.

The node feature may reflect information related to the user node, the gas pipeline branch node, and the gas supply point. For example, the node feature of the user node may include user information, a gas use record, a current position, etc. For another example, the node feature of the gas pipeline branch node may include a gas flow, a gas flow rate, etc. For another example, the node feature of the gas supply point may include the gas flow at the gas supply point, the gas flow rate at the gas supply point, a total gas usage corresponding to different time periods, etc. The gas flow rate and the gas flow rate may be obtained from meters such as flow meters, flow rate meters, etc. deployed in the gas pipeline.

The edge 451 may correspond to the gas pipeline. For example, two gas pipeline branch nodes connected by a gas pipeline may have an edge between them, and a direction of the gas flow may be a direction of the edge. The edge feature may reflect information about the gas pipeline. For example, the edge feature may include a gas pipeline length, a gas pipeline class (e.g., a main pipeline, a primary branch pipeline, a secondary branch pipeline, etc.), etc.

In some embodiments, the edge 451 may have a direction, and the node may have an outgoing edge and/or an ingoing edge. The ingoing edge may be an edge pointing toward the node, and the outgoing edge may be an edge pointing from the node to another node. That is, the gas may flow into the node from the gas pipeline branch node and may further flow out of the gas pipeline branch node.

The demand prediction model 460 may be configured to predict the gas demand in the future time period. The demand prediction model 460 may be a graph neural network (GNN) model or other models, or may be other processing layers and other processing modes added to the GNN.

In some embodiments, an input to the demand prediction model 460 may include a gas demand map 450 and at least one future time period 420. The gas supply node of the gas demand map 450 may output the predicted gas demand in the future time period 470.

In some embodiments, the demand prediction model 460 may be trained based on training data. The training data may include a training sample and a label. For example, the training sample may include a sample gas demand map for a sample time period, and the label may be the gas demand for a sample time period corresponding to each sample gas demand map. The node, the node feature, the edge, and the edge feature of the sample gas demand map may be similar to the above descriptions. The training sample may be determined based on historical data, and the label may be determined by the smart gas safety management platform 130 or human labeling. The sample time period may be a randomly selected time period.

In some embodiments, the demand prediction model 460 may be trained based on a plurality of labeled training samples. The smart gas safety management platform 130 may input the plurality of labeled training samples into an initial demand prediction model, construct a loss function from the labels and the results of the initial demand prediction model, and iteratively update, based on the loss function, parameters of the initial demand prediction model. The training of the model may be completed when the loss function of the initial demand prediction model satisfies a preset condition, and a trained demand prediction model may then be obtained. The preset condition may be that the loss function converges, a number of iterations reaches a threshold, etc.

In some embodiments, the smart gas safety management platform 130 may determine a demand coefficient based on fluctuating values of the sample gas usage records in the training sample, as well as determine the labels based on the demand coefficient and an actual gas demand of the gas supply point.

The fluctuation value refers to a variance of the gas usage volume for the same time period in the sample gas use records. For example, if the gas usage volume between 08:00 and 10:00 in a first sample gas usage record is M cubic meters, and the gas usage volume between 08:00 and 10:00 in a second sample gas usage record is N cubic meters, then the fluctuation value may be the variance of M and N.

The demand coefficient refers to the parameter value correlated to a degree of smoothing of the gas usage volume. For example, for a sample gas usage record that has a greater fluctuation in gas usage volume (i.e., a higher degree of uncertainty in the gas flow rate), the sample gas usage record may correspond to a greater demand coefficient. In some embodiments, the demand coefficient may be greater than or equal to 1. In some embodiments, the demand coefficient may be positively correlated to the fluctuation value.

In some embodiments, the label may be a product of the demand coefficient and the gas demand in the sample time period.

In some embodiments of the present disclosure, the gas demand map allows for predicting the gas demand in the future time period based on complex physical intrinsic connections through a demand prediction model. For the gas users to be supplied in different positions, even though with the same gas rate, their demands for the gas flow, the gas flow rate, the gas pressure, etc. may be different, and the gas demand map allows for the gas users to be supplied in different positions to be correlated with each other, and various factors affecting the gas demand may be comprehensively considered to predict the gas demand.

In some embodiments of the present disclosure, by constructing the gas demand map based on the user data and the gas data, the trained demand prediction model may be utilized to predict the gas demand for at least one future time period, which enables a more accurately prediction of the gas demand at the gas supply point considering the actual situation, so as to reduce a manpower cost and a waste of resources required for a human assessment.

Figure 5:
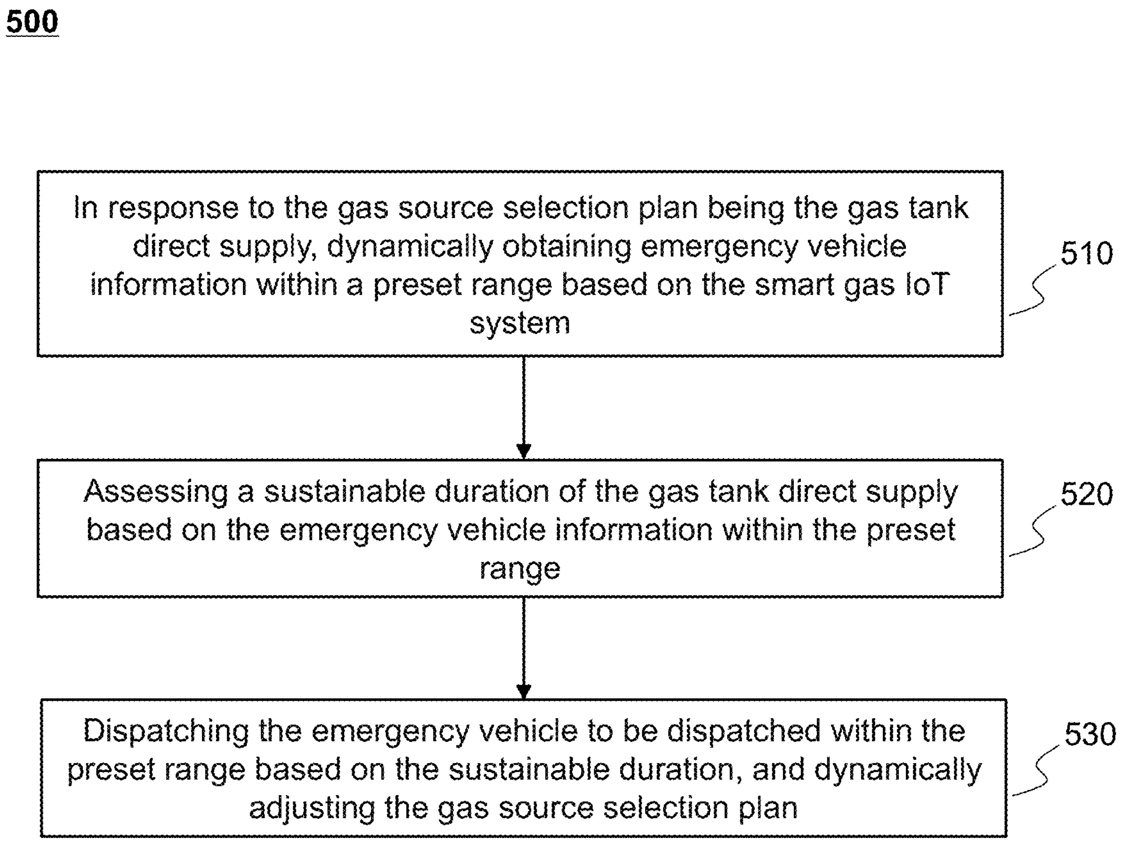
FIG. 5 is a flowchart illustrating an exemplary process for dispatching emergency vehicle and adjusting gas source selection plan according to some embodiments of the present disclosure.

FIG. 5 a flowchart illustrating an exemplary process for dispatching emergency vehicle and adjusting gas source selection plan according to some embodiments of the present disclosure. In some embodiments, in response to the gas source selection plan being a gas tank direct supply, a process 500 may be performed based on the smart gas safety management platform 130 and/or the control module 260. As shown in FIG. 5, the process 500 may include the following operations.

In 510, in response to the gas source selection plan being the gas tank direct supply, dynamically obtaining emergency vehicle information within a preset range based on the smart gas IoT system 100. In some embodiments, the smart gas IoT system 100 may at least include the smart gas safety management platform 130, the smart gas object platform 150, etc.

For more contents on the preset range, please refer to FIG. 2 and the associated descriptions. For more contents on the emergency vehicle information, please refer to FIG. 3 and the related descriptions.

In some embodiments, the smart gas IoT system 100 may dynamically obtain the emergency vehicle information within the preset range in various ways. The "dynamically obtaining" may refer to automatically grabbing relevant information. For example, the smart gas IoT system 100 may dynamically obtain the emergency vehicle information within the preset range through a preset or statistical mode, a storage device, the smart gas object platform 150, etc.

In 520, assessing a sustainable duration of the gas tank direct supply based on the emergency vehicle information within the preset range.

The sustainable duration refers to the duration for which the gas tank direct supply is able to supply gas continuously. For example, the sustainable duration may be a period of time from a start of the gas supply from the gas tank to an interruption of the gas supply from the gas tank.

In some embodiments, the sustainable duration of the direct gas tank supply may be assessed in various ways. For example, the smart gas safety management platform 130 may construct an assessment vector based on a gas demand, a gas supply point, user information, and emergency vehicle information, and determine, by searching a vector database, at least one candidate database whose similarity degree is greater than a preset threshold. After that, a weighted summation may be performed on candidate sustainable durations corresponding to the at least one candidate vector, and then the sustainable duration of the gas tank direct gas supply may be determined.

In some embodiments, the smart gas safety management platform 130 may obtain a dispatchable emergency vehicle in a future time period, as well as determine a sustainable duration of the gas tank direct supply based on a current position and a gas tank storage capacity of the dispatchable emergency vehicle.

The dispatchable emergency vehicle refers to an emergency vehicle in an idle state. For example, the dispatchable emergency vehicle may be an emergency vehicle that is located within a preset range and is not responding to an emergency gas supply.

In some embodiments, the smart gas safety management platform 130 may obtain the dispatchable emergency vehicle within the preset range in various ways. For example, the smart gas safety management platform 130 may obtain the dispatchable emergency vehicle within the preset range through information uploaded by the smart gas object platform.

In some embodiments, the smart gas safety management platform 130 may sort the plurality of dispatchable emergency vehicles from near to far based on the current position of the plurality of dispatchable emergency vehicles and the gas supply point. For each dispatchable emergency vehicle, the smart gas safety management platform 130 may determine, based on the gas demand and a gas tank storage capacity, a gas supply duration of the dispatchable emergency vehicle.

For example, the smart gas safety management platform 130 may determine, based on the distance order and the gas supply durations of the plurality of dispatchable emergency vehicles, a dispatchable emergency vehicle that is unable to arrive at the gas supply point in time for the gas emergency supply as an interrupted emergency vehicle, and determine a dispatchable emergency vehicle before the interrupted emergency vehicle as a target emergency vehicle. The smart gas safety management platform 130 may determine a time point when the gas tank storage capacity of the target emergency vehicle is depleted as a termination time point of the sustainable duration, and determine, based on a start time point and the termination time point of the gas supply of the gas tank, the sustainable duration of the gas tank direct supply.

In some embodiments of the present disclosure, a continuous gas supply to the emergency gas supply point may be ensured by determining the sustainable duration of the gas tank direct supply based on the current position of the dispatchable emergency vehicle and the gas tank storage capacity.

In some embodiments, the sustainable duration may also be related to a distance between the gas supply point and a gas storage station. In some embodiments, the smart gas safety management platform 130 may determine, based on the distance between the gas supply point and the gas storage station, a duration for the dispatchable emergency vehicle to travel from the gas supply point to the gas storage station to replenish the gas and to return to the gas supply point (i.e., a gas replenish duration) within a preset range; and determine, based on the gas replenish duration, the sustainable duration of the gas tank direct supply by determining whether the emergency vehicle to be dispatched within the preset range satisfies a condition for a continuous gas supply after the gas tank storage capacity of the dispatchable emergency vehicle is exhausted.

In some embodiments, the condition for the continuous gas supply refers to a condition for the emergency vehicles to be dispatched in the preset range to be capable of continuing the gas supply during the replenishment time period. For example, the condition for the continuous gas supply may include the distance between the emergency vehicle to be dispatched and the gas supply point being less than or equal to a second distance threshold, a gas tank storage capacity of the emergency vehicle to be dispatched being greater than or equal to a storage capacity threshold, etc. The second distance threshold may be a maximum distance within the replenishment duration that the emergency vehicle to be dispatched is able to travel to the gas supply point. The storage capacity threshold may be the minimum storage capacity within the replenishment duration for which the emergency vehicle to be dispatched is capable of performing the emergency gas supply.

In some embodiments, the smart gas safety management platform 130 may determine the emergency vehicle to be dispatched that is not able to arrive at the gas supply point in time for the emergency gas supply within the replenishment time period as the interrupted emergency vehicle, and determine an emergency vehicle to be dispatched before the interrupted emergency vehicle as the target emergency vehicle. The smart gas safety management platform 130 may determine a time point when the storage capacity of the storage tanks of the target emergency vehicle is depleted as a termination time point of the sustainable duration, and determine, based on the start time point and termination time point of the gas supply from the gas tank, the sustainable duration of the gas tank direct supply.

In some embodiments of the present disclosure, by determining the replenishment duration of the emergency vehicle, and determining whether the emergency vehicle to be dispatched is able to meet the condition of continuous gas supply within the replenishment duration, the sustainable duration may be determined, so as to implement a gas supply circulation of the supply point, and avoid a negative impact brought by a gas outage.

In 530, dispatching the emergency vehicle to be dispatched within the preset range based on the sustainable duration, and dynamically adjusting the gas source selection plan.

For more contents on the emergency vehicle to be dispatched and the gas source selection plan, please refer to FIG. 2 and the related contents.

In some embodiments, the smart gas safety management platform 130 may determine priorities of a plurality of emergency vehicles to be dispatched within the preset range based on the sustainable duration, as well as dispatch a corresponding emergency vehicle to be dispatched to the gas supply point based on the priorities.

The priority of the emergency vehicle to be dispatched may be related to the emergency vehicle information. For example, the emergency vehicle to be dispatched in an idle state (i.e., the dispatchable emergency vehicle) may have the highest priority, and the emergency vehicle to be dispatched in a busy state (i.e., has responded to other tasks) may have the lowest priority. For another example, the emergency vehicle to be dispatched closest to the gas supply point and has a high gas tank storage capacity may have the highest priority.

In some embodiments, the smart gas safety management platform 130 may determine, based on a weighted sum of the current position, the idle-busy state, and the gas tank storage capacity, the priority of a corresponding emergency vehicle to be dispatched, and, may further sort, based on the weighted sum, the priorities of the emergency vehicles to be dispatched, and dispatch the emergency vehicle to be dispatched with the highest priority to the gas supply point.

In some embodiments, the smart gas safety management platform 130 may adjust the gas source selection plan to a gas pipeline network crossover based on the termination time point of the sustainable duration, and send relevant adjustment information to the smart gas rescue and repair management sub-platform. Through a work order dispatch module and a material preparation module, staff and/or crossover materials for performing the gas pipeline network crossover may be dispatched and/or prepared in advance.

In some embodiments of the present disclosure, when the gas source selection plan is the gas tank direct supply, by assessing the sustainable duration of the gas tank direct supply, the emergency vehicle may be dispatched, and the gas source selection plan may be dynamically adjusted. In this way, a gas source supply plan may be adjusted in accordance with the actual situation of emergency gas supply, so as to ensure the continuous gas supply of the gas supply point.

The basic concepts have been described above, and it may be apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments are still within the spirit and scope of the exemplary embodiments of the present disclosure.

What is claimed is:

1. A smart gas emergency gas supply equipment, wherein the smart gas emergency gas supply equipment is an emergency vehicle including a skid-mounted vehicle, a gas storage tank, an extensible pipeline group, a pressure regulating device, a gasification device, and a control module, the skid-mounted vehicle being configured to install the gas storage tank, the extensible pipeline group, the pressure regulating device, the gasification device, and the control module by skid-mounting, and the control module referring to a module for receiving a control command and executing the control command;

the extensible pipeline group at least including a gas inlet pipeline group and a gas outlet pipeline group, wherein the gas inlet pipeline group is configured to connect to a pipeline in a gas pipeline network or an emergency vehicle to be dispatched within a preset range, and the gas outlet pipeline group is configured to connect to the pipeline in the gas pipeline network or the pressure regulating device;

the pressure regulating device being configured to regulate a gas pressure;

the gasification device being configured to gasify a liquefied natural gas in the gas storage tank;

the control module being configured to determine, based on an emergency gas supply plan of the smart gas emergency gas supply device, operating parameters of the pressure regulating device and operating parameters of the gasification device, wherein the emergency gas supply plan at least includes a gas source selection plan and a gas demand, the gas source selection plan at least including a gas pipeline network crossover and a gas tank direct supply, the operating parameters of the pressure regulating device include an inlet pressure, an outlet pressure, and a regulating range, and the operating parameters of the gasification device include a gasification pressure and an operating temperature;

the control module being further configured to determine the operating parameters of the pressure regulating device and the operating parameters of the gasification device based on a gas usage volume demand, a gas flow demand, and a gas pressure demand of a pipeline where a gas supply point, wherein the determination of the operating parameters of the pressure regulating device and the operating parameters of the gasification device based on the gas usage volume demand, the gas flow demand, and the gas pressure demand of the pipeline where the gas supply point comprises:

adjusting the inlet pressure, the outlet pressure, and the regulating range of the pressure regulating device, as well as the gasification pressure and the operating temperature of the gasification device, based on the gas usage volume demand and the gas flow demand;

in response to the gas source selection plan being the gas tank direct supply, setting the operating parameters of the gasification device based on a using specification of a manufacturer; and in response to the gas source selection plan being the gas pipeline network crossover, setting the operating parameters of the gasification device to 0 to shut down the gasification device.

2. The smart gas emergency gas supply equipment of claim 1, wherein the gas source selection plan is determined based on user information of a user to be supplied with the gas, and the determination of the gas source selection plan comprises:

determining a future time period based on a failure repair duration;

determining a gas demand map based on the user information and a gas use record;

predicting a gas demand in the future time period based on the gas demand map through a demand prediction model, wherein the demand prediction model is a machine learning model; and determining the gas source selection plan based on the gas demand in the future time period, wherein the demand prediction model is obtained based on a plurality of training samples with labels by training;

the labels are obtained by a process including:

determining a demand coefficient based on a fluctuation value of a sample gas use record in the plurality of training samples; and determining the labels based on the demand coefficient and an actual gas demand at the gas supply point, wherein the fluctuation value is a variance of gas usage volumes for a same time period in the sample gas use record, and the demand coefficient is greater than or equal to 1; and the training of the demand prediction model further includes:

inputting the plurality of training samples with labels into an initial demand prediction model, constructing a loss function from the labels and results of the initial demand prediction model, iteratively updating, based on the loss function, parameters of the initial demand prediction model, in response to the loss function of the initial demand prediction model satisfying a preset condition, completing the training of the model, and obtaining the demand prediction model, wherein the preset condition includes a number of iterations reaching a threshold.

3. The smart gas emergency gas supply equipment of claim 2, wherein the gas demand map is a data structure including nodes and edges, the nodes include a user node, a gas pipeline branch node, and the gas supply point, a node feature of the user node includes the user information, the gas use record, and a current position, a node feature of the gas pipeline branch node includes a gas flow and a gas flow rate, a node feature of the gas supply point includes a gas flow at the gas supply point, a gas flow rate at the gas supply point, and a total gas usage corresponding to different time periods, and the gas flow and the gas flow rate are obtained from meters deployed in the gas pipeline network.

4. The smart gas emergency gas supply equipment of claim 2, wherein the determining the gas source selection plan based on the gas demand in the future time period comprises:

determining a gas pipeline network crossover cost and a gas tank direct supply cost based on the gas demand; and determining the gas source selection plan based on the gas pipeline network crossover cost and the gas tank direct supply cost, wherein the gas pipeline network crossover cost is related to a manpower requirement, a deployment duration, and a crossover length corresponding to the gas pipeline network crossover, and the gas tank direct supply cost is related to an emergency vehicle trip and a transportation distance corresponding to the gas tank direct supply.

5. The smart gas emergency gas supply equipment of claim 4, wherein the gas tank direct supply cost is further related to a demand degree of the emergency vehicle to be dispatched within the preset range, wherein the demand degree of the emergency vehicle to be dispatched is determined based on emergency vehicle information.

6. The smart gas emergency gas supply equipment of claim 1, wherein the control module is further configured to:

in response to the gas source selection plan being the gas tank direct supply, dynamically obtain emergency vehicle information within the preset range based on a smart gas Internet of Things (IoT) platform, wherein the emergency vehicle information includes at least one of a current position, an idle-busy state, and a gas storage tank storage capacity;

assess a sustainable duration of the gas tank direct supply based on the emergency vehicle information within the preset range; and dispatch the emergency vehicle to be dispatched within the preset range based on the sustainable duration, and dynamically adjust the gas source selection plan, wherein to dispatch the emergency vehicle to be dispatched within the preset range based on the sustainable duration, and dynamically adjust the gas source selection plan, the control module is further configured to:

determining priorities of a plurality of emergency vehicles to be dispatched within the preset range based on the sustainable duration, and dispatching a corresponding emergency vehicle to be dispatched to the gas supply point based on the priorities;

adjusting the gas source selection plan to the gas pipeline network crossover based on a termination time point of the sustainable duration, and sending relevant adjustment information to a smart gas rescue and repair management sub-platform; and dispatching and preparing staff and crossover materials for performing the gas pipeline network crossover in advance through a work order dispatch module and a material preparation module.

7. The smart gas emergency gas supply equipment of claim 6, wherein to assess the sustainable duration of the gas tank direct supply, the control module is further configured to:

obtain a dispatchable emergency vehicle in a future time period; and determine, based on the current position of the dispatchable emergency vehicle and the gas storage tank storage capacity, the sustainable duration of the gas tank direct supply.

8. The smart gas emergency gas supply equipment of claim 7, wherein the sustainable duration is also related to a distance between the gas supply point and a gas storage station; and to assess the sustainable duration of the gas tank direct supply, the control module is further configured to:

determine, based on the distance between the gas supply point and the gas storage station, a gas replenish duration for the dispatchable emergency vehicle to travel from the gas supply point to the gas storage station to replenish the gas and to return to the gas supply point within the preset range; and determining, based on the gas replenish duration, the sustainable duration of the gas tank direct supply by determining whether the emergency vehicle to be dispatched within the preset range satisfies a condition for a continuous gas supply after the gas tank storage capacity of the dispatchable emergency vehicle is exhausted.

9. A smart gas emergency gas supply Internet of Things (IoT) system, wherein the smart gas emergency gas supply IoT system includes a smart gas device object platform and a smart gas safety management platform, the smart gas device object platform being configured to manage a smart gas emergency gas supply equipment, wherein the smart gas emergency gas supply equipment is an emergency vehicle, the emergency vehicle including a skid-mounted vehicle, a gas storage tank, an extendable pipeline group, a pressure regulating device, a gasification device, and a control module, the skid-mounted vehicle being configured to install the gas storage tank, the extensible pipeline group, the pressure regulating device, the gasification device, and the control module by skid-mounting, and the control module referring to a module for receiving a control command and executing the control command;

the extensible pipeline group at least including a gas inlet pipeline group and a gas outlet pipeline group, wherein the gas inlet pipeline group is configured to connect to a pipeline in a gas pipeline network or an emergency vehicle to be dispatched within a preset range, and the gas outlet pipeline group is configured to connect to the pipeline in the gas pipeline network or the pressure regulating device;

the pressure regulating device being configured to regulate a gas pressure;

the gasification device being configured to gasify a liquefied natural gas in the storage tank; and the control module being configured to determine, based on an emergency gas supply plan of the smart gas emergency gas supply device, operating parameters of the pressure regulating device and operating parameters of the gasification device, wherein the emergency gas supply plan at least includes a gas source selection plan and a gas demand, the gas source selection plan at least including a gas pipeline network crossover and a gas tank direct supply, the operating parameters of the pressure regulating device include an inlet pressure, an outlet pressure, and a regulating range, and the operating parameters of the gasification device include a gasification pressure and an operating temperature;

the control module being further configured to determine the operating parameters of the pressure regulating device and the operating parameters of the gasification device based on a gas usage volume demand, a gas flow demand, and a gas pressure demand of a pipeline where a gas supply point, wherein the determination of the operating parameters of the pressure regulating device and the operating parameters of the gasification device based on the gas usage volume demand, the gas flow demand, and the gas pressure demand of the pipeline where the gas supply point comprises:

adjusting the inlet pressure, the outlet pressure, and the regulating range of the pressure regulating device, as well as the gasification pressure and the operating temperature of the gasification device, based on the gas usage volume demand and the gas flow demand;

in response to the gas source selection plan being the gas tank direct supply, setting the operating parameters of the gasification device based on a using specification of a manufacturer; and in response to the gas source selection plan being the gas pipeline network crossover, setting the operating parameters of the gasification device to 0 to shut down the gasification device.

10. The smart gas emergency gas supply IoT system of claim 9, wherein the IoT system further includes: a smart gas user platform, a smart gas service platform, and a smart gas sensor network platform; and the smart gas safety management platform is configured to transmit the gas source selection plan and the gas demand to at least one of the smart gas user platform, the smart gas service platform, the smart gas sensor network platform, and the smart gas object platform.

11. The smart gas emergency gas supply IoT system of claim 9, wherein the gas source selection plan is determined based on user information of a user to be supplied with gas, and the determination of the gas source selection plan comprises:

determining a future time period based on a failure repair duration;

determining a gas demand map based on the user information and a gas use record;

predicting a gas demand in the future time period based on the gas demand map through a demand prediction model, wherein the demand prediction model is a machine learning model; and determining the gas source selection plan based on the gas demand in the future time period, wherein the demand prediction model is obtained based on a plurality of training samples with labels by training;

the labels are obtained by a process including:

determining a demand coefficient based on a fluctuation value of a sample gas use record in the plurality of training samples; and determining the labels based on the demand coefficient and an actual gas demand at the gas supply point, wherein the fluctuation value is a variance of gas usage volumes for a same time period in the sample gas use record, and the demand coefficient is greater than or equal to 1; and the training of the demand prediction model further includes:

inputting the plurality of training samples with labels into an initial demand prediction model, constructing a loss function from the labels and results of the initial demand prediction model, iteratively updating, based on the loss function, parameters of the initial demand prediction model, in response to the loss function of the initial demand prediction model satisfying a preset condition, completing the training of the model, and obtaining the demand prediction model, wherein the preset condition includes a number of iterations reaching a threshold.

12. The smart gas emergency gas supply IoT system of claim 11, wherein the smart gas safety management platform is further configured to:

determine a gas pipeline network crossover cost and a gas tank direct supply cost based on the gas demand; and determine the gas source selection plan based on the gas pipeline network crossover cost and the gas tank direct supply cost, wherein the gas pipeline network crossover cost is related to a manpower requirement, a deployment duration, and a crossover length corresponding to the gas pipeline network crossover, and the gas tank direct supply cost is related to an emergency vehicle trip and a transportation distance corresponding to the gas tank direct supply.

13. The smart gas emergency gas supply IoT system of claim 12, wherein the gas tank direct supply cost is further related to a demand degree of the emergency vehicle to be dispatched within the preset range, wherein the demand degree of the emergency vehicle to be dispatched is determined based on emergency vehicle information.

14. The smart gas emergency gas supply IoT system of claim 9, wherein the smart gas safety management platform is further configured to:

in response to the gas source selection plan being the gas tank direct supply, dynamically obtain emergency vehicle information within the preset range, wherein the emergency vehicle information includes at least one of a current position, an idle-busy state, and a gas storage tank storage capacity;

assess a sustainable duration of the gas tank direct supply based on the emergency vehicle information within the preset range; and dispatch the emergency vehicle to be dispatched within the preset range based on the sustainable duration, and dynamically adjust the gas source selection plan, wherein to dispatch the emergency vehicle to be dispatched within the preset range based on the sustainable duration, and dynamically adjust the gas source selection plan, the control module is further configured to:

determining priorities of a plurality of emergency vehicles to be dispatched within the preset range based on the sustainable duration, and dispatching a corresponding emergency vehicle to be dispatched to the gas supply point based on the priorities;

adjusting the gas source selection plan to the gas pipeline network crossover based on a termination time point of the sustainable duration, and sending relevant adjustment information to a smart gas rescue and repair management sub-platform; and dispatching and preparing staff and crossover materials for performing the gas pipeline network crossover in advance through a work order dispatch module and a material preparation module.

15. The smart gas emergency gas supply IoT system of claim 14, wherein the smart gas safety management platform is further configured to:

obtain a dispatchable emergency vehicle in a future time period; and determine, based on the current position of the dispatchable emergency vehicle and the gas storage tank storage capacity, the sustainable duration of the gas tank direct supply.

* * * * *